United States Patent Office 3,442,733
Patented May 6, 1969

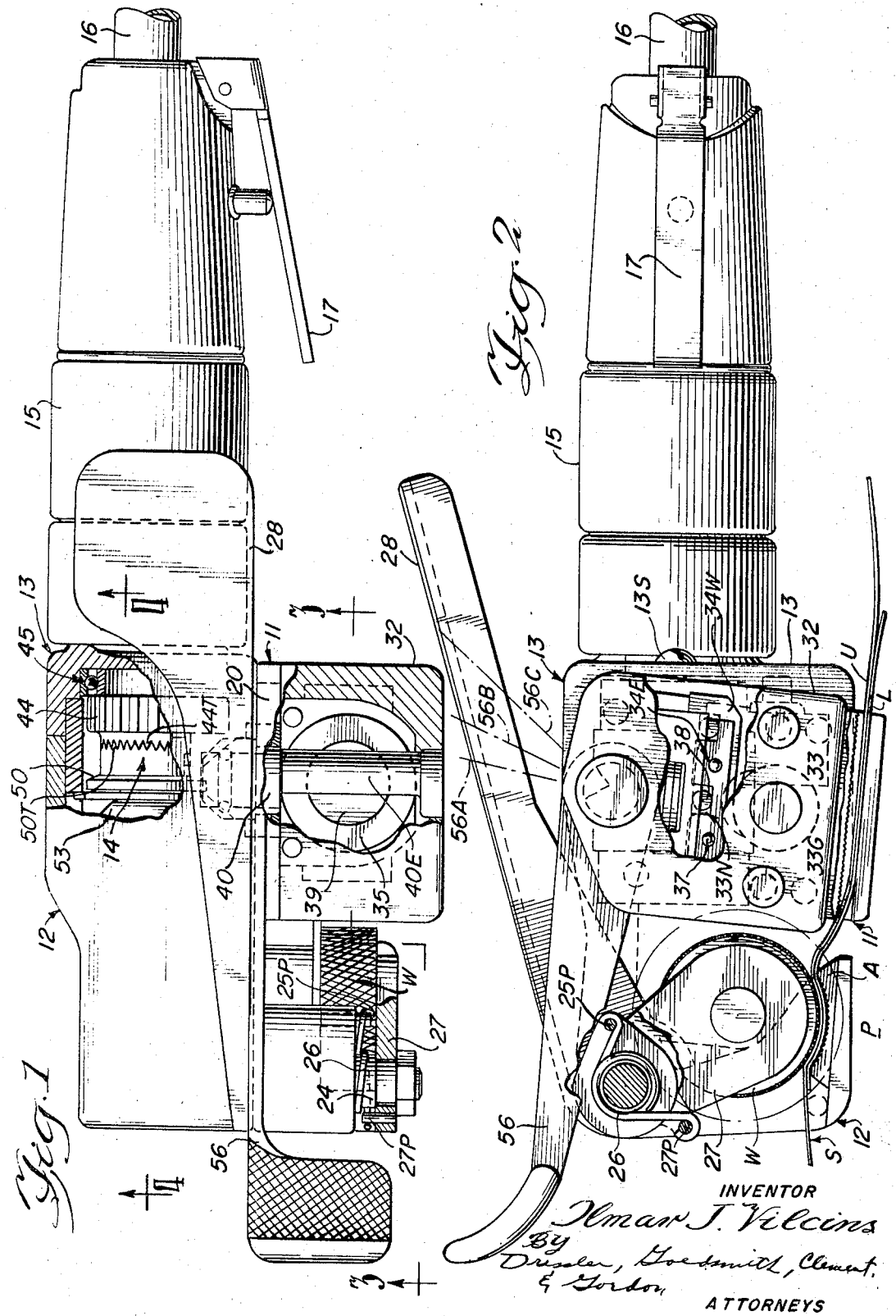

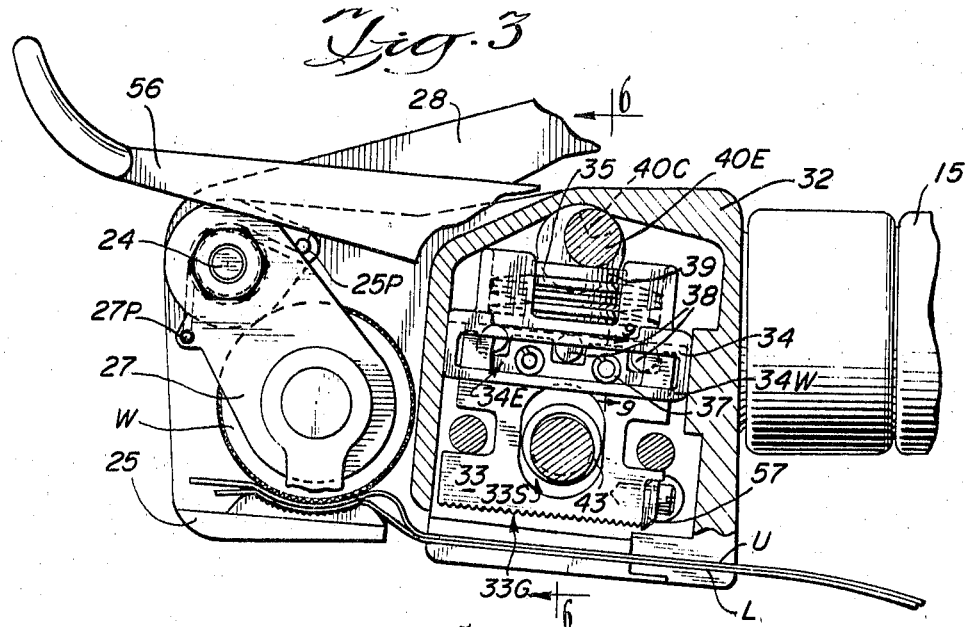
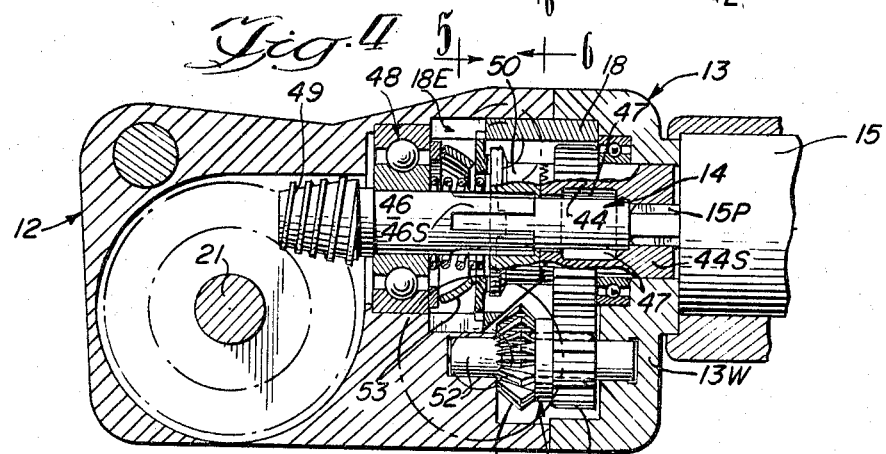
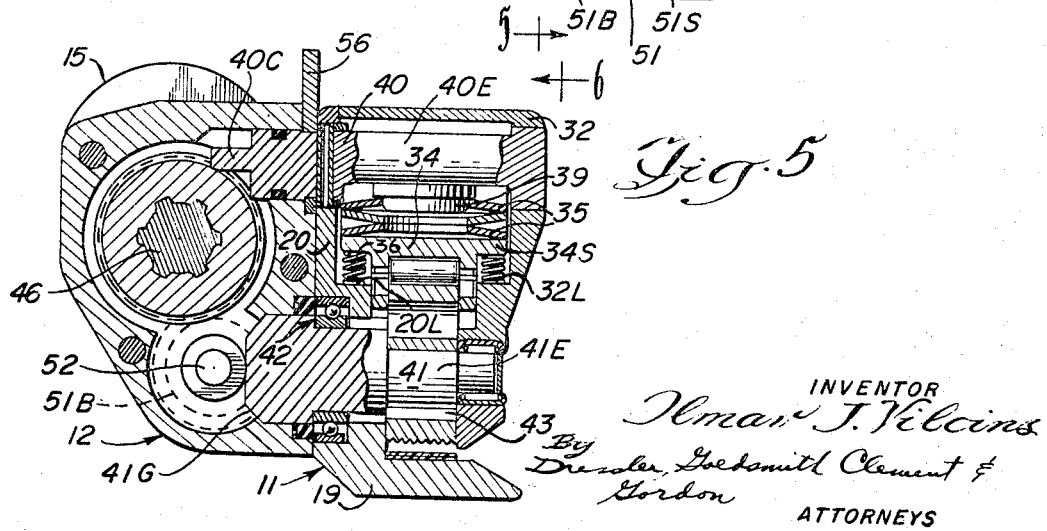

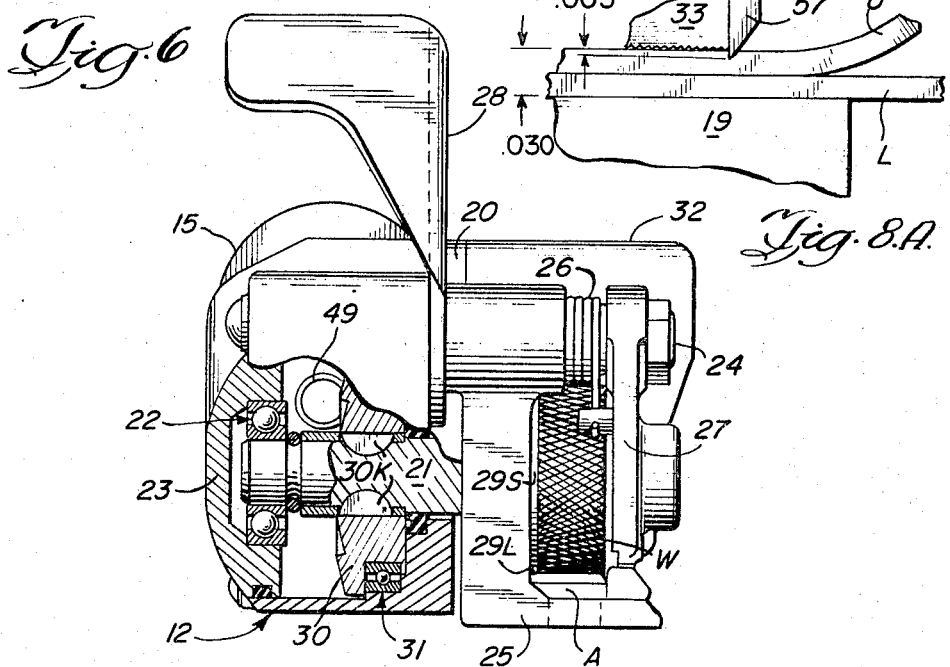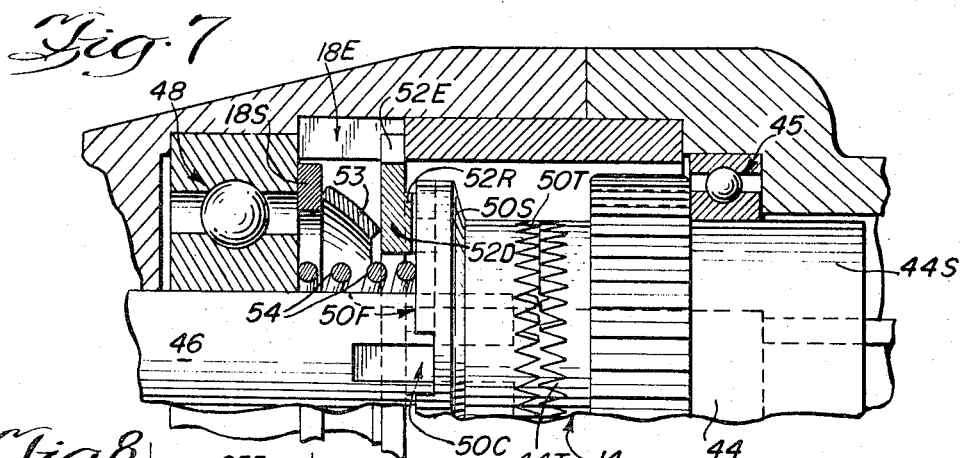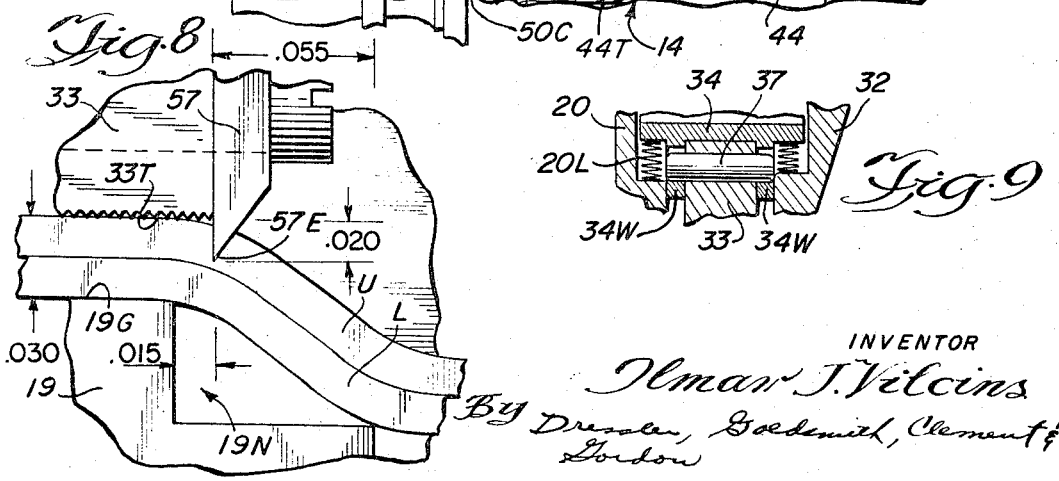

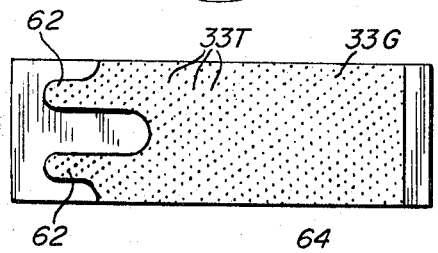
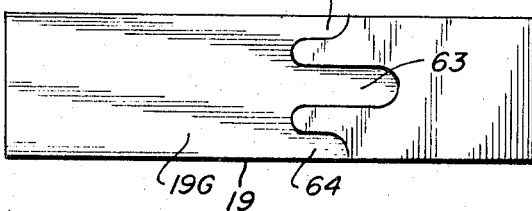
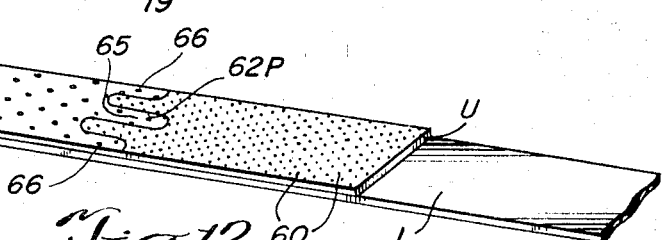
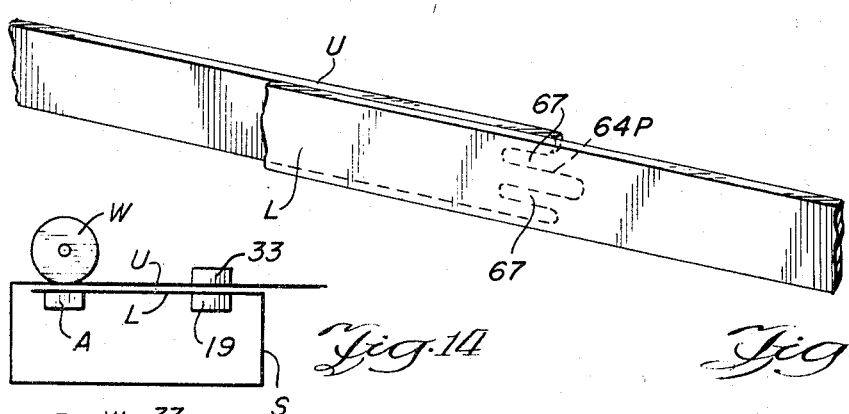
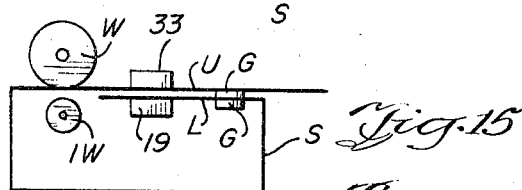

3,442,733
COMBINATION STRAP TENSIONING AND
SEALING TOOL
Ilmar J. Vilcins, Northbrook, Ill., assignor to Signode
Corporation, a corporation of Delaware
Filed Feb. 2, 1966, Ser. No. 524,429
Int. Cl. B32b 31/20
U.S. Cl. 156—73                                   25 Claims

ABSTRACT OF THE DISCLOSURE

A method and apparatus for providing a ligature about an article including providing a length of thermoplastic strap having a tensioned loop and overlapping end portions. The end portions of the length of strap are first compressed and then moved multidirectionally relative to one another to effect interface melting between the overlapping end portions. A common drive means is provided for operating both the loop tensioning mechanism and the strap moving mechanism, and the drive means is controlled such that during actuation of the loop tensioning mechanism it is not possible to operate the strap moving mechanism, while during actuation of the strap moving mechanism it is not possible to operate the loop tensioning mechanism. The joint is completed by maintaining the interface regions in fusing contact until solidification is effected.

BACKGROUND OF THE INVENTION

This invention relates to a method and apparatus for providing a ligature of thermoplastic strap in binding engagement about an article. The disclosure of this application is related to the disclosure in Stensaker application, Ser. No. 524,432, filed Feb. 2, 1966, concurrently herewith and to the disclosure of a pending Stensaker et al. application, Ser. No. 479,446, filed Aug. 13, 1965, the disclosures of which to the extent not inconsistent herewith are specifically incorporated herein by this reference. More particularly, this invention is concerned with a combination tool engageable with overlapping strap portions at opposite ends of a loop of thermoplastic strap that encircles an article for drawing the loop in a direction to shrink the loop about the article and while maintaining the loop about the article effecting mutual interface melting and solidification by producing bodily sliding frictional movement between contacting surface regions of the overlapping strap portions.

SUMMARY OF THE INVENTION

In the full operating mechanism for a combination tool of this type, separate loop constricting facilities and friction-fusion joint forming facilities are provided. The loop constricting facilities first operate unidirectionally to shrink and hold the loop of strap about the article until sealing is accomplished. The joint forming facilities impose pressure between overlapping strap portions at opposite ends of the loop and are activated only after the loop is drawn and held. A simplified drive arrangement is controlled for sequentially actuating the loop constricting facilities and the joint forming facilities.

Simplified control mechanism utilizes a single control lever for sequencing the actuation of the loop constricting and the joint forming facilities and includes provisions for preventing sealer engagement while the loop is being drawn and provisions for holding the loop while the joint former is engaged and operated.

In one embodiment, a single pneumatic motor serves as the drive both for the loop constricting mechanism and for the joint forming mechanism. The loop constricting mechanism herein illustrated includes a feed wheel and a curved anvil carried on a contact foot that engages the article being tied. The friction-fusion joint forming mechanism includes a movable pressure jaw and a stationary pressure jaw that also serves as a contact foot. The overlapping strap portions at opposite ends of the strap loop lead through both of these mechanisms in a configuration wherein the loop constricting mechanism holds the loop of strap about the article while the stationary pressure jaw contacts a strap portion which is within the loop and the movable pressure jaw contacts a strap portion which is external of the loop. A gear train driven by the motor has releasable coupling to the feed wheel and permanent coupling to the movable pressure jaw. The releasable coupling to the feed wheel includes a clutch and a brake.

The single control lever is effective when in a first position to disengage the brake, to engage the clutch for effecting coupling of the feed wheel to the drive motor, and to relieve pressure on the strap at the sealer. This control lever is effective when in a second position to disengage the clutch, thereby to apply the brake for holding the feed wheel and to apply full pressure to the strap portions between the jaws. Movement of the control lever from the first position toward the second position loads the jaws against the strap and applies pressure through a mechanical spring. During this movement, the control lever serves to apply the brake on the feed wheel and then to disengage the clutch, while the movable pressure jaw is oscillated continuously when the pneumatic motor is running.

The pneumatic motor is adjustable to stall at a predetermined value of loop tension. When the control lever disengages the stalled motor from the feed wheel, the motor starts up and again drives the movable jaw. A simplified gear train arrangement is accommodated by employing permanent coupling to the movable jaw and by employing a fixed axis feed wheel shaft and mounting a cooperating anvil for shifting movement towards and away from the feed wheel.

Bodily sliding frictional movement is applied to a slack strap section in an oscillating mode oriented in the loop direction while maintaining the loop about the article. The slack section may remain slack during oscillating movement or may experience limited tension depending on the initial direction of movement.

Rapid release of the tool, after solidification is achieved at the joint, enables the loop tension to act on the interface region of the joint while the same is still warm. This effect stresses the joint in a fashion to increase its ultimate strength with some strap materials.

An automatic cutter is associated with one of the pressure jaws of the joint forming mechanism to combine shearing and heating effects for severing the strap loop from the strap supply during the actual joint forming cycle.

Contoured gripper jaw configurations at the tension bearing end regions of the joint provide a distinctive joint pattern of increased tensile strength.

Other features and advantages of the invention will be apparent from the following description and claims and are illustrated in the accompanying drawings which show structure embodying preferred features of the present invention and the principles thereof, and what is now considered to be the best mode in which to apply these principles.

BRIEF DESCRIPTION OF THE DRAWINGS

In the accompanying drawings forming a part of the specification, and in which like numerals are employed to designate like parts throughout the same:

FIG. 1 is a plan view of a combination strap tensioning and sealing tool in accordance with this invention, with portions of the structure broken away and sectioned to facilitate disclosure;

FIG. 2 is a side elevation of the tool, with portions of the structure broken away and sectioned, and showing the tool threaded with strap and positioned upon a package to be tied;

FIG. 3 is a fragmentary side view partly in elevation and partly in section illustrating the strap contacting parts of the tensioner and sealer and is taken as indicated on the line 3—3 of FIG. 1;

FIG. 4 is a side sectional view showing the gear train portion of the tool and is taken on the line 4—4 of FIG. 1;

FIG. 5 is a transverse section taken as indicated on the line 5—5 of FIG. 4;

FIG. 6 is an end view partly in elevation and partly in section and is taken as indicated on the line 6—6 of FIG. 4;

FIG. 7 is a greatly enlarged fragmentary view through the gear train and illustrating the brake and clutch structure, with the clutch disengaged from the gear train and held by the brake;

FIG. 8 is a fragmentary elevational view of the pressure jaws and cutter;

FIG. 8A is a fragmentary elevational view of another pressure jaw and cutter configuration;

FIG. 9 is a sectional detail view illustrating the mounting of the upper end of the movable jaw in the pressure pad;

FIGS. 10 and 11 are face views of the movable and stationary pressure jaws, respectively;

FIGS. 12 and 13 are top and bottom perspective views of a finished joint; and

FIGS. 14 and 15 are comparative schematic views.

DESCRIPTION OF THE PREFERRED EMBODIMENT

Referring now to the drawings, for purposes of illustrative disclosure the invention is shown embodied in a combination power tool which is intended for use with strap of oriented, organic thermoplastic materials such as nylon, polypropylene and the like, but certain aspects of the invention are applicable to other embodiments of combination tools.

The tool is illustrated in its entirety in FIGS. 1 and 2 and in FIG. 2 is shown seated upon a package P which is represented with a loop of strap S encircling it and having overlapping upper and lower strap end portions U and L threaded through the tool. The upper strap end portion U may lead from a suitable supply reel, not shown.

The main framing structure of the tool consists of a base 11, a gear box 12 and a motor mount 13. The gear box 12 and motor mount 13 are aligned end to end as best seen in FIGS. 1, 4 and 7, and collectively house a gear train designated generally at 14. A pneumatic motor 15 of any conventional type projects into and is carried by the motor mount 13 and is equipped with a flexible air line 16 and an external on-off valve lever 17. The motor 15 serves as a convenient handle for engaging and positioning the tool and the valve lever 17 is normally spring biased to the flared valve-open position illustrated in FIG. 1 to be readily gripped by the operator with the same hand that holds the motor. A spacer sleeve 18 shown seated within the gear box serves as a guide housing for the gear train 14 and extends beyond the gear box 12 to abut the motor mount 13 and be held stationary by axial clamping pressure between the motor mount and gear box as applied by one or more cap screws 13S. Thus, the spacer sleeve 18 takes the loading applied by the cap screws and the confronting edges of the motor mount 13 and gear box 12 are not actually forced together.

The base 11 has a stationary contact foot 19 (later referred to as a stationary jaw) to engage the package P and has an upstanding rear wall 20 secured directly to aligned vertical walls presented by the gear box and the motor mount.

The loop constricting mechanism of the tool illustrated herein includes a feed wheel shaft 21 projecting laterally into the gear box 12 and supported to rotate about a stationary axis by means including a bearing 22 (FIGURE 6) seated in the side wall of a gear box cover 23. A feed wheel W is mounted on the feed wheel shaft 21 to rotate therewith. A stationary support shaft 24 extends from the gear box at a higher elevation and receives a pivotally mounted contact foot 25, a torsion spring 26 and an outer support link 27 that is stationary and serves as a mount for the outer end of the feed wheel shaft 21. The torsion spring 26 reacts at one end against a pin 27P on the support link 27 and at the other end against a pin 25P on the contact foot 25 normally to bias the contact foot to rotate counterclockwise as viewed in FIGS. 2 and 3. An operating handle 28 for positioning the contact foot is provided and extends to a location to be squeezed towards the motor 15 by thumb pressure applied by the same hand that grips the motor. This handle 28 serves to swing the contact foot 25 against the action of the torsion spring 26 and away from the feed wheel W to facilitate initial threading of strap in the tool.

A plug-like curved anvil A is carried on the contact foot 25 and faces upwardly towards the feed wheel to establish stationary holding engagement against the lower strap end L. A machined shoulder 29S is integral with the feed wheel W and is of slightly less diameter to ride against an upstanding rear lip 29L provided on the curved anvil A for establishing a minimum clearance between the strap gripping surfaces of the feed wheel W and the curved anvil A.

Finally, the loop constricting mechanism includes a spiroid gear 30 (FIG. 6) rotatably mounted within a bearing 31 which is seated within the gear box 12. The spiroid gear 30 is engaged to the feed wheel shaft 21 by suitable keys 30K.

The friction-fusion joint forming mechanism includes a cover 32 joined to the rear wall 20 of the base to provide an open bottom chamber that receives a movable block-like pressure jaw 33, a pressure pad 34 and load springs 35 (see FIGS. 3, 5 and 8). The pressure pad 34 is floatingly supported within the cover chamber by means of coil type lifter springs 36 and has depending walls 34W closely flanking and receiving the supper end of the movable pressure jaw 33. The pressure pad 34 has side wings 34S overhanging internal abutment ledges 20L and 32L provided on the vertical wall 20 of the base and on the interior of the cover 32. The lifter springs 36 act vertically to elevate the pressure pad when the force of the load springs 35 is relieved. While the pressure pad 34 has endwise abutment within the cover housing 32, thereby restricting its endwise or lengthwise movement, transverse roll pins 37 extend snugly through the block-like jaw 33 and loosely through elongated slots 34E (FIGURE 3) in the walls 34W to carry the jaw for vertical floating movement jointly with the pressure pad while accommodating limited relative lengthwise or horizontal movement of the jaw 33. A set of three rollers 38 which may be in the form of dowel pins are located in lengthwise spaced notches 33N defined at the top of the movable pressure jaw 33 and serve as anti-friction pressure transmitting elements accommodating easy to and fro movement of the jaw 33 relative to the pressure pad 34 even when high vertical force loading is applied through the pressure pad 34.

Thus in the absence of load pressure applied from the springs 35, the movable jaw 33 and pressure pad 34 are in the elevated positions illustrated in FIGS. 2 and 5. The load springs 35 are here represented as a stack of three Belleville washers having pressure applied through a guide plug 39 which rides against an eccentric section 40E of an actuator shaft 40. The shaft 40 is journaled in the front wall of the cover 32 and extends through the vertical wall 20 of the base and into the gear box.

Movement is imparted to the pressure jaw 33 by means of a rotary shaft 41 (see FIG. 5) which has its front end journaled in the lower end of the front wall of the cover 32 and which has its rear end journaled in a bearing 42 that is seated in the base. The rotary shaft 41 terminates in a bevel gear 41G that faces into the gear box. The rotary shaft 41 has an eccentric portion 41E fitted with a bushing 43 which rides in a vertically elongated slot 33S provided in the block-like movable jaw so that the eccentric motion imparted to the bushing drives the jaw 33 horizontally to and fro in the loop direction without causing vertical shifting thereof.

The gear train 14 that connects the motor 15 to drive the loop constricting and joint forming mechanisms is best shown in FIGS. 4–7. The motor 15 has a shaft terminating in a pinion 15P that is drivingly engaged centrally within a main drive gear 44. The main drive gear 44 includes a stub shaft portion 44S journaled within a bearing 45 that is seated in the transverse main wall 13W of the motor mount. A splined rotary shaft 46 has one end journaled in needle bearings 47 nested within an axial end socket provided by the main drive gear and has its other end projecting through and journaled in a bearing 48 that is seated within a central region of the gear box. This latter end of the rotary shaft 46 terminates in a spiroid pinion 49. A splined intermediate portion 46S of the shaft mounts a clutch 50 for axial shifting movement within the gear box.

The clutch 50 has jaw teeth 50T cooperable with jaw teeth 44T provided on an end face of the main drive gear 44. Thus when the clutch is engaged as illustrated in FIGS. 1 and 4, the motor 15 drives the feed wheel W through the following gearing elements, namely the pinion 15P, the main drive gear 44, the clutch 50, the splined rotary shaft 46, the spiroid pinion 49 and finally the feed wheel gear 30 and shaft 21. This draws tension on the loop of strap until the motor stalls.

The drive to the rotary shaft 41 is from the main drive gear 44 through a combination gear 51 (FIGURE 4) to the bevel gear 41G. The combination gear 51 has a spur gear section 51S meshing with the main drive gear 44, and a bevel gear section 51B meshing with the bevel gear 41G. The idler gear 51 is journaled on a stationary shaft 52 having one end seated in the gear box 12 and having the other end seated in the transverse wall 13W of the motor mount.

When the clutch is disengaged as illustrated in FIG. 7, the feed wheel W, feed wheel shaft 21, the feed wheel gear 30, the splined shaft 46 and the clutch 50 are free wheeling in relation to the motor and must be held against rotation if tension is to be maintained on the loop of strap. A lock or brake disc 52D is shown encircling the splined shaft 46 adjacent to the clutch end face 50F. The clutch end face has a cruciform slot 50C to receive diametral ribbing portions 52R provided on the brake disc 52D. A washer-like spring 53 encircles the splined shaft 46 and reacts between a spring seat ring 18S within the spacer sleeve and the brake disc 52D normally to urge the disc towards the clutch end face 50F. The spacer sleeve 18 has opposed end slots 18E that receive peripheral ears 52E on the brake disc to accommodate limited axial shifting of the disc while preventing rotation thereof, and prevent brake action when the clutch meshes with the drive gear 44. The clutch is normally biased to fully meshed position by an inner coil spring 54 that extends through the washer spring 53.

The rear end of the actuator shaft 40 has a cam extension 40C to enable rotation of the actuator shaft to shift the clutch 50 against the action of the spring 54 thereby disengaging the clutch 50 from the main drive gear 44, and engaging the ribs 52R on the brake disc 52 in the cruciform slot 50C of the clutch. An external control lever 56 is drivingly pinned to the actuator shaft 40 at the region thereof that leads through the vertical wall 20 of the base, with the control lever 56 being swingable from its full line position illustrated in FIGS. 2 and 3 to move clockwise and successively pass through lever centerline positions illustrated in phantom lines in FIG. 2 and labeled 56A, 56B and 56C.

The initial swinging movement of the handle begins to bring the eccentric portion 40E of the actuator shaft into play against the guide 39 to load the Belleville springs 35. Continued swinging movement gradually increases the loading on the springs 35 with peak loading being attained only at the limit position of travel indicated by lever centerline 56C. During the gradual loading of the springs 35, the cam 40C swings into engagement with the clutch shoulder 50S to shift the clutch along the splined shaft 46 and bring the brake disc 52 and the clutch into position for positive interlock. By the time the control lever 56 reaches the lever centerline position 56A, the brake is positively engaged to hold the clutch against reverse rotation forces arising from the action of the tensioned loop on the feed wheel. Where the slot 50C and the cruciform ribbing 52R do not find initial registry, some limited reverse rotation may occur before interlock. At centerline position 56A, the clutch teeth 50T are almost clear of the teeth 44T on the main drive gear and further movement to lever centerline position 56B provides full clearance. The control lever 56 thus serves multiple functions in that it actuates the load springs 35 to establish the movable jaw 33 in compressing relation against the overlapping strap portions U and L, and concurrently it applies brake action to the tensioner and releases the clutch 50 to enable the drive motor 15 to reciprocate the movable jaw 33 to and fro in the loop direction.

In the configuration illustrated herein, the contact foot 19 serves as a stationary pressure jaw contacting the lower overlapping strap portion L which is under full loop tension. While the strap section L is to remain stationary during jaw vibration, this can be achieved where the contact face 19G presented by the stationary pressure jaw 19 (see FIG. 11) is not roughened or knurled because the loop tension restrains any tendency for the strap portion L to move. The upper overlapping strap portion U which leads to the supply reel, or is otherwise free, is slack and it is engaged by a contact face 33G (see FIG. 10) provided on the underside of the movable pressure jaw 33. This face is provided with gripping teeth 33T, or is otherwise roughened or knurled, to enable the pressure jaw to establish and maintain a stable grip upon the upper strap portion U sufficient to move it to and fro in the lengthwise loop direction in the presence of the relatively high pressures acting on the strap due to the load springs 35. The load springs 35 enable the tool to accommodate a range of strap thicknesses. Depending on the location and direction of the eccentric shaft portion 41E at the start of vibration, the slack section contacted by the gripper face 33G may or may not be subjected to limited tension during sealing.

In one specific embodiment, the area of each gripper face is approximately ½ inch by 1⅜ inches and where the thickness of the strap is .030 inch peak pressure of about 1150 p.s.i. is achieved. Somewhat lower pressures result where the strap is of thinner section but the loop tension factors are correspondingly less. The sealer pressure can be as low as 300 p.s.i. if the gripper teeth configuration is such as to enable the movable jaw 33 to maintain a stable grip as it reciprocates the strap. The movable pressure jaw 33 vibrates at a cycle rate of 6500 cycles per minute and the movement may be maintained for about 3 seconds as a typical value though only one second is adequate. The peak to peak vibration travel of the movable pressure jaw 33 is .055 inch so that a total travel figure of about 30 inches is achieved in a 3 second interval.

The particular tool arrangement disclosed herein has the movable jaw 33 spaced closely adjacent the feed wheel W and during the joint forming interval, the intermediate portion of the upper strap is repeatedly flexed to a bowed relationship as illustrated in phantom lines in FIG. 3. The fatigue effects associated with this repeated flexing and bowing are readily handled by nylon strap. Notched or imprinted polypropylene strap is more subject to failure due to these fatigue effects and a tool embodiment for eliminating this problem may employ greater spacing between the feed wheel W and the movable jaw to minimize the extent of flexing and bowing.

As is pointed out in the aforementioned Stensaker et al. application, nylon strap has a sharply defined melting point and can be effectively fused by accurately regulating the total sliding friction travel to an amount of about 3 to 4 inches with solidification occurring while the strap is held stationary during a cooling interval following. With nylon continued sliding friction travel beyond the indicated range of 3 to 4 inches can create effects which impair ultimate strength at the joint. This type of joint problem is solved by subjecting the joint to tension while it is still hot. The present tool arrangement enables rapid release of the strap after joint solidification so that loop tension may act on the strap while it is still warm. Thus, return of the control lever 56 to the tensioning position after shut off of the motor 15 enables loop tension to act on the joint. The ultimate joint strength both while warm or hot and later when fully cooled is substantially greater because of applying tension to the joint while warm or hot.

One truly practical effect concerned with tensioning of warm joints between ends of nylon strap is that the greater the tension applied to the warm joint, the greater the ultimate joint strength. In addition, the joint strength exceeds the tension so that, when dealing with tensioned loops, the joint strength can be greatly enhanced by subjecting the warm joint to the tension acting in the loop. The ultimate joint strength, thus resulting, is greater than the actual tension in the loop so the finished loop will remain sound unless abnormal stresses are encountered during subsequent handling.

The transmission of load through the joint is significantly improved, presumably because the warm or hot state of the strap portions at the joint area at the time the joint is tensioned makes these strap portions more ductile and allows them to undergo plastic deformation so that the joint may elongate without cracking. When the joint ultimately cools and freezes, the strap portions at the joint lose ductility and the joint is in effect prestressed. When the load on the joint is ultimately removed, as by cutting the strap loop, the joint assumes a wavy configuration evidencing this prestressed effect.

Another practical feature incorporated in the joint forming mechanism of the present tool is the use of a cutter blade 57 mounted across one end edge of the movable pressure jaw 33 and presenting a depending knife edge 57E projecting below the plane of the gripper face 33G. This cutter blade is best illustrated in FIG. 8 and it will be noted that the stationary pressure jaw 19 has a corner notch 19N underlying the cutter blade so that the overlapping strap portions assume a curving contour through the region between the cutter blade 57 and the corner notch 19N. In the particular illustration of FIG. 8, the strap sections are .015 inch thick, the knife edge 57E is spaced .020 inch below the plane of the gripper face 33G and the line of the knife edge, assuming the movable jaw 33 is at its leftmost position, is offset .015 inch from the vertical wall of the notch 19N.

When the sealer is in vibration and the straps are under pressure, the knife edge 57E partly penetrates the upper strap portion U and thereby develops a line of pressure concentration at the interface. This line of pressure concentration moves back and forth along the lower strap, but acts always at the same region of the upper strap so that heat accumulates until surface melting occurs on the interface surface of the upper strap but not at the region on the interface surface of the lower strap that is transversed by the cutter edge. This melting effect causes the cutter blade to sever the upper strap automatically after about a 3 second vibration interval. This cut-off is facilitated if the free end of the upper strap is maintained taut by the operator.

Another cutter mounting configuraion is illustrated in FIG. 8A wherein the stationary lower jaw 19 is longer than the movable jaw 33 and the cutter 57 overhangs the extension of the stationary jaw. For strap of .015 inch thickness, the cutter edge 57E projects .005 inch beyond the plane of the strap contact face of the movable jaw 33. A similar automatic shearing and melting action serves the upper strap portion U without impairing the lower strap portion L.

Operation of the tool through a complete tensioning and sealing cycle may now be described. The control lever 56 is in the position illustrated in full lines so that no pressure acts on the strap portions at the joint forming mechanism and the movable pressure jaw 33 is spaced above the stationary pressure jaw 19. The operator grips the motor 15 in his right hand and by thumb pressure on handle 28 swings the tensioner foot 25 clockwise as viewed in FIG. 2 to establish clearance between the tensioning wheel W and the anvil A. A strap S having been looped about the package P and having overlapping upper and lower strap portions U and L is then loaded into the tool and the handle 28 released so that the lower strap portion L is stationarily held by the anvil A and the upper strap portion is drivingly engaged by the wheel W.

While holding the motor 15, the operator squeezes the lever 17 to turn on the motor and drive directly through the gear train 14 to rotate the feed wheel W and pull tension until the motor stalls. During the tensioning cycle, the movable jaw 33 is vibrated to and fro, but it is spaced above the strap and has no operational effect nor does it impose any loading upon the motor. When the motor stalls, the vibration of the movable jaw 33 also terminates. The control lever 56 is now swung until it reaches the lever centerline position indicated by line 56C. During this swinging movement, the movable jaw 33 is lowered onto the strap and pressure is gradually applied through the load springs 35 while the brake 52 is engaged against the clutch 50 and the clutch is freed from the main drive gear 44. The loop constricting mechanism is not engaged to the motor but is held against reverse movement by the brake disc 52 positively interlocking with the clutch 50. As soon as the motor drive system is relieved of the loop load, the stalled motor starts up and vibrates the movable jaw 33. So long as the control lever remains in this shifted position, the movable jaw 33 continues to vibrate concurrently to compress the strap portions and to move the top strap to and fro until interface melting occurs at the strap regions overlapped by the sealer jaw faces 33G and 19G. When the cutter 57 automatically severs the free end of the upper strap U, the motor lever 17 is released and interface cooling and solidification occurs. During this cooling interval, no loop tension force acts on the interface region. After a sufficient solidification interval, ½ second or more, the control lever is returned to its initial full line position to release the friction-fusion joint forming parts and disengage the brake while also restoring the clutch. The release of the brake enables loop tension to act against the feed wheel W and therefore to act upon the joint while the same is still warm.

The final friction-fused strap joint, as shown in FIGS. 12 and 13, has teeth marks 60 on the upper strap portion U due to the teeth 33T on contact face 33G and the adjoining region of the upper strap has teeth marks 61 due to the feed wheel. Actually, the feed wheel teeth marks 61 will also normally appear over part or all of the region of the teeth marks 60. No teeth marks of either type appear on the lower strap portion L.

The friction-fused joint represented in FIGS. 12 and 13 has unique discernible physical characteristics. The interface melting occasioned by the bodily sliding frictional movement and the subsequent solidification under stationary compression provides an interface layer having a thickness of .004 inch and having an imprinted contour determined by the strap contact faces of the jaws.

The contact face 33G has side by side peaked tongue portions 62 providing a contour determining a curved joint edge profile 62P (see FIG. 12) at the jaw end where strap tension effects can occur on the slack upper strap portion during and after joint formation. Correspondingly, the contact face 19G has a central tongue portion 63 and lateral tongue portions 64 providing a contour determining a curved joint edge profile 64P (see FIG. 13) at the jaw end where strap tension effects act continuously on the tensioned lower strap portion.

In either case, the joint edge profile is a smoothly curving boundary line leading progressively across the strap and exhibiting a total length substantially greater than the strap width. Each of these boundary lines represents a line of weakness between a normal (or unfused) region of strap and an integrally merging adjacent fused region. This line of weakness condition exists because of temperature, pressure and tension effects acting during the joint forming operation. The curved joint edge profiles have proven to exhibit greater strength than a straight joint edge profile which is subject to breaking upon extended cycling of the movable jaw vibration.

In the case of the upper strap, the line of weakness breakage problem is aggravated by feed wheel tooth marks at that region and a curved joint edge profile is particularly important where feed wheel tooth marks have imprinted the strap as the loop is being drawn about the article. Polypropylene strap, previously mentioned in relation to bowing and flexing, is also particularly subject, in the thinner sizes (.020 inch), to line of weakness breakage, a problem aggravated by the feed wheel imprinting action, but this is solved by the curved joint profile disclosed.

In the case of the upper strap U (FIG. 12), the normal strap has a bulbous central tongue portion 65 and less pronounced lateral tongue portions 66 integrally leading into or merging with the fused strap region. The same configuration could be employed for the lower strap except it would impair the desired automatic strap cutting action. Accordingly, the lower strap L has gently bulging narrow tongue portions 67 integrally leading into or merging with the fused strap region. The portions 67 do not present pressure regions to the line of the knife edge 57E and thus do not enable friction heating and melting completely along the upper strap region. The portions 67, however, are narrow to minimize the interrupted regions and enable the same to shear easily upon melting and cutting of the remainder of the upper strap by the knife edge.

The tool is of minimum size and weight. The tool can be rearranged by reversing the direction of feed wheel rotation so that the movable jaw 33 acts upon a strap portion which is under loop tension.

It may be noted that in the particular tool embodiment illustrated in FIGS. 1 to 13 hereof, the loop constricting mechanism employs a stationary anvil A to grip a lead portion of the strap loop, with the feed wheel W which serves to withdraw the supply end portion of the strap being operable in direct conjunction with the stationary anvil. This concept is very generally depicted in the schematic view of FIG. 14.

Alternative embodiments employing different configurations for the loop constricting mechanism are also contemplated. For illustrative purposes, one such alternative is illustrated schematically in FIG. 15, wherein the loop constricting mechanism is distributed in a fashion to flank the pressure jaws 19, 33. In particular, the loop constricting mechanism includes a pair of grippers G to clamp a portion of strap at the lead end of the loop and a feed wheel W cooperating with an idler wheel IW or other equivalent back up element to engage and withdraw a portion of strap adjacent the supply end of the loop. Thus, in this form, the loop constricting mechanism engages the loop at spaced regions. This alternative embodiment has been illustrated only generally but it may be embodied in a combination tool by mounting an idler in place of the anvil A and by mounting a rocking gripper plug on a base extension.

Thus, while preferred constructional features of the invention are embodied in the structure illustrated herein, it is to be understood that changes and variations may be made by those skilled in the art without departing from the spirit and scope of the appended claims.

What is claimed is:

1. Apparatus for providing a ligature about an article by constricting and closing a loop of thermoplastic strap that encircles the article and has overlapping strap portions, said apparatus comprising: loop constricting mechanism mounted to engage the loop of strap; friction-fusion joint forming mechanism mounted to engage the overlapping strap portions; and means for sequentially actuating said mechanisms to first constrict and hold the loop and to then cause multidirectional relative bodily sliding frictional movement and subsequent stationary compression of the overlapping strap portions while the loop is held, said actuating means including a shiftably mounted actuator operable in a first position to prevent strap compressing engagement by the joint forming mechanism and operable in a second position to prevent strap movement at the loop constricting mechanism.

2. Apparatus in accordance with claim 1 and wherein said apparatus has means including a main frame engageable with the article and mounting said loop constricting mechanism and said joint forming mechanism in adjacent relation, said actuator being mounted on the main frame.

3. Apparatus in accordance with claim 1 and wherein the joint forming mechanism includes confronting movable and stationary pressure jaws to compress the overlapping strap portions, and means for vibrating the movable jaw multidirectionally to effect bodily sliding frictional movement between the overlapping strap portions while the loop is held.

4. Apparatus in accordance with claim 1 and wherein said loop constricting mechanism has a feed wheel, a rotary shaft drivingly connected to rotate the feed wheel in one direction, a releasable coupling to the rotary shaft, and lock means to prevent reverse rotation of the feed wheel and wherein a single means is connected for disengaging the coupling to the rotary shaft while engaging the lock means.

5. Apparatus in accordance with claim 1 and wherein said joint forming mechanism includes confronting movable and stationary pressure jaws to engage the overlapping strap portions, a rotary shaft drivingly connected to shift the movable jaw prior to and during strap compressing engagement of the movable jaw and an eccentric shaft is connected to control strap compressing engagement of the movable jaw.

6. Apparatus in accordance with claim 5 and wherein said stationary pressure jaw is positioned to engage a strap portion within the loop being held by the loop constricting mechanism and said movable pressure jaw is positioned to engage a strap portion outside the loop being held by the loop constricting mechanism.

7. Apparatus in accordance with claim 1 and wherein said loop constricting mechanism includes a feed wheel, a rotary shaft drivingly connected to rotate the feed wheel in one direction, a releasable coupling to the rotary shaft and lock means to prevent reverse rotation of the feed wheel, and wherein said joint forming mechanism includes confronting movable and stationary pressure jaws to engage the overlapping strap portions, and a rotary shaft drivingly connected to shift the movable jaw along the stationary jaw, and wherein said sequentially actuating means includes a common drive motor connected to the releasable coupling and to the last named rotary shaft, and a common control element shiftable between a first position wherein said coupling is engaged, said lock means is disengaged and said movable jaw is prevented from strap compressing engagement and a second position wherein said coupling is released, said lock means is engaged and said movable jaw is maintained in strap compressing engagement.

8. Apparatus in accordance with claim 7 and wherein said common drive motor stalls automatically upon driving the loop constricting mechanism until a predetermined value of loop tension is achieved.

9. Apparatus in accordance with claim 1 and wherein said joint forming mechanism includes confronting movable and stationary pressure jaws and pressure applying means for shifting the jaws relatively towards and away from each other, framing means mounting said mechanisms along the overlapping strap portions to dispose each mechanism for engagement with corresponding overlying regions of said strap portions, common drive means carried by said framing means and including a first gear train releasably connected to drive said loop constricting mechanism, a second gear train connected to vibrate said movable jaw multidirectionally in a plane parallel to said confronting jaws and motor means for actuating said gear trains simultaneously, and control means shiftably carried by said framing means and operative in a first position to unload said pressure means and operative in a second position to disengage and lock said first gear train, and to load said pressure means.

10. Apparatus in accordance with claim 1 and wherein said loop constricting mechanism includes a feed wheel shaft mounted to rotate about a stationary transverse axis and carrying a feed wheel, and means mounting an anvil to swing about a parallel transverse axis to move towards and away from the feed wheel.

11. Apparatus in accordance with claim 1 and having main frame structure including a gear box section and a handle section rigidly interengaged, and a contact foot extending laterally and providing a stationary pressure jaw, housing structure carried from the main frame structure and mounting a movable pressure jaw in confronting relation to a stationary pressure jaw, a rotary shaft mounted in the gear box section and having means eccentrically engaging the movable pressure jaw to accommodate floating movement of the movable pressure jaw towards and away from the stationary jaw and to effect planar multidirectional movement thereof parallel to the stationary pressure jaw while maintaining substantial registry between said jaws, a feed wheel shaft mounted in the gear box section and projecting laterally thereof to carry and rotatably drive a feed wheel, a movable contact foot projecting laterally of and shiftably mounted from said gear box section to provide an anvil movable toward and away from the feed wheel, said gear box section and said handle section cooperably mounting a first gear train drive releasably connected to rotate said feed wheel, and a second gear train drive permanently connected to said rotary shaft, a drive motor within said handle section and connected for actuating said gear trains simultaneously, and control means including a cam shaft projecting crosswise through said gear box structure and said housing structure and having means operable when the cam shaft is in a predetermined position to disengage said first gear train to lock said feed wheel and to load said movable jaw towards the stationary jaw to compress the strap portions therebetween.

12. Apparatus in accordance with claim 11 and wherein sealer housing structure contains a pressure pad overlying and laterally flanking the movable jaw, anti-friction means interposed in force transmitting relation between said pressure pad and said movable jaw to accommodate lengthwise movement of the movable jaw within the housing structure, said cam shaft spanning said housing structure within the top thereof and connected to be shifted by said control means, and mechanical spring means within said housing structure and interposed between said pressure pad and said cam shaft to vary pressure applied by said sealer jaw in accordance with the setting of said cam shaft.

13. Apparatus for constricting and closing a loop of thermoplastic strap that encircles an article and has overlapping strap portions, said apparatus comprising: loop constricting mechanism mounted to engage the loop of strap; friction-fusion joint forming mechanism mounted to engage the overlapping strap portions; first means to actuate said loop constricting mechanism to constrict and hold the loop in a predetermined relation about the article; second means to actuate said friction-fusion joint forming mechanism while the loop is held to cause multidirectional relative bodily sliding frictional movement and subsequent stationary compression of corresponding interface regions of the overlapping strap portions; and selective control means actuatable to sequentially operate said first means while preventing operation of said second means and to then operate said second means while preventing operation of said first means.

14. Apparatus in accordance with claim 13 and wherein said apparatus has means including a main frame engageable with the article and mounting said loop constricting mechanism and said joint forming mechanism in adjacent spaced relation and mounting each of said first and second actuating means direct driving engagement to the corresponding mechanism, and wherein said control means is shiftably mounted on the main frame and operable in a first position to prevent strap compressing engagement by the joint forming mechanism and operable in a second position to prevent strap movement at the loop constricting mechanism.

15. Apparatus for providing a ligature about an article by constricting and closing a loop of thermoplastic strap that encircles the article and has overlapping outer and inner strap portions, said apparatus including a main frame having portions to engage the article, loop constricting mechanism mounted from the main frame and engageable with the loop of strap to constrict the loop, sealing mechanism mounted from the main frame in spaced relation from the loop constricting mechanism along a lengthwise strap direction and having first and second pressure jaw means cooperable to hold said strap portions together, control means shiftably mounted on said main frame and selectively operable to a first position to enable separate actuation of said loop constricting mechanism and to a second position to load said first and second jaw means relatively towards each other for establishing frictionally contacting interface surface regions between said strap portions, and drive means connected for driving one of said pressure jaw means multidirectionally relative to the other in a plane parallel to the plane of contact of the interface regions while the same are compressed for producing bodily sliding frictional movement between said contacting interface surface regions to develop interface melting.

16. Apparatus for joining overlapping portions of thermoplastic strap, said apparatus comprising confronting movable and stationary jaws mounted to engage the overlapping strap portions, an eccentric shaft supporting the movable jaw and rotatable to move the same towards and away from the stationary jaw to control strap compressing engagement of the jaws and a drive shaft drivingly connected to shift the movable jaw multidirectionally prior to and during strap compressing engagement thereof.

17. Apparatus in accordance with claim 16 and including a base providing said stationary pressure jaw, hollow housing structure carried by said base and having a bottom opening facing said stationary pressure jaw, said movable pressure jaw being disposed in said hollow housing structure to face through said bottom opening and confront said stationary pressure jaw, means for supporting said movable jaw and including a pressure pad in said housing structure and overlying and flanking said movable jaw and anti-friction means interposed between said pressure pad and movable jaw to accommodate movement of said movable jaw in the presence of pressure loading thereon, mechanical spring means within said housing structure and overlying said pressure pad, said eccentric shaft being mounted in said housing structure and engageable with said mechanical spring means to load the same against said pad and force said movable jaw towards said stationary jaw and said drive shaft having an eccentric portion projecting transversely through said movable jaw and rotatably supported in said housing structure to reciprocate said movable jaw to effect bodily sliding frictional movement between the strap portions compressed between said jaws.

18. A sealer mechanism for forming a friction-fused joint between overlapping thermoplastic strap portions, said mechanism having means for effecting heating of interface surface regions of said overlapping strap portions and including a pair of pressure jaws, at least one of said jaws being movable relative to the other jaw to place the jaws in confronting compressing relation against said overlapping strap portions, said heating means further including means for shifting said one pressure jaw relative to said other pressure jaw multidirectionally to effect bodily sliding frictional movement of said interface surface regions, one of said jaws having a strap contact surface characterized by an elongated smoothly curving contour line leading progressively crosswise at one end thereof and defining a plurality of longitudinally extending tongues, said line being of substantially greater length than the width of the strap contact surface to define a corresponding joint end boundary line.

19. A sealer mechanism in accordance with claim 18 and wherein the other of said jaws has a strap contact surface characterized by an elongated smoothly curving contour line leading progressively crosswise at an end thereof remote from said one end of said one jaw, said last mentioned contour line defining a plurality of longitudinally extending tongues to define a corresponding joint end boundary line.

20. Apparatus in accordance with claim 3 and wherein said loop constricting mechanism has means including a strap imprinting feed wheel rotatable against one of said strap portions to advance the same through said confronting jaws to present an imprinted region to be contacted and compressed by said movable jaw during movement of said movable jaw, said movable jaw having a strap contact surface characterized by an elongated smoothly curving contour line leading progressively crosswise at an end thereof adjacent to said feed wheel to define a corresponding joint end boundary line.

21. Apparatus for providing a ligature in binding engagement about an article by closing and severing a loop of thermoplastic strap that encircles the article and has overlapping strap portions, said apparatus having friction-fusion joint forming mechanism including means mounting a pair of pressure jaws in confronting compressing relation against said overlapping strap portions, means for relatively shifting said jaws multidirectionally in a plane parallel thereto to effect bodily sliding frictional movement between contacting surfaces of the overlapping strap portions, and a cutter mounted to maintain a fixed relation to one of said jaws and to the strap portion contacted thereby, said cutter presenting a cutter edge partly penetrating the last-named strap portion and concurrently presenting a line of pressure concentration of said last-named strap portion moving against the other strap portion to enable heat of sliding friction to accumulate at the strap region contacted by the cutter edge and accomplish final severance of the said last-named strap portion.

22. Apparatus in accordance with claim 3 and including a cutter mounted to move in unison with the movable jaw and with the strap portion contacted thereby, said cutter presenting a cutter edge partly penetrating the last-named strap portion and concurrently presenting a line of pressure concentration of said last-named strap portion moving against the other strap portion to enable heat of sliding friction to accumulate at the strap region contacted by the cutter edge and accomplish final severance of the said last-named strap portion.

23. Apparatus in accordance with claim 22 and wherein the vibrating means drives the movable pressure jaw at a rate of several thousand cycles per minute in a multidirectional low amplitude mode of movement parallel to the plane of the jaws and in the lengthwise direction of the loop, said stationary pressure jaws having a corner recess crosswise at one end region of its strap contact surface, and said movable pressure jaw carrying the rigidly mounted cutter crosswise of the corresponding end region of strap contact surface to locate the cutter edge projecting towards the corner recess for movement in a lengthwise range spanned by the corner recess.

24. A process for severing a thermoplastic strap portion comprising impressing a cutter edge gentrally crosswise against the strap portion to partly penetrate the same and concurrently to present a line of pressure concentration of the strap portion against an adjacent contacting surface, and concurrently effecting multidirectional relative movement between the line of pressure concentration and said adjacent contacting surface to generate heat of sliding friction therebetween and accumulate heat at the strap region contacted by the cutter edge to accomplish final severance of the strap portion.

25. A process in accordance with claim 24 for closing and severing a loop of thermoplastic strap that encircles an article and has overlapping strap portions, said process including maintaining the loop about the article and, concurrently with impressing the cutter edge against one overlapping strap portion to present a line of pressure concentration against the other overlapping strap portion, impressing a pair of pressure jaws to hold adjacent regions of the overlapping strap portions compressed and moving one of said pressure jaws correspondingly multidirectionally in unison with the cutter, and after severance of the strap compressing said overlapping strap portions in stationary fusing contact to achieve interface solidification and unification of the overlapping strap portions.

References Cited

UNITED STATES PATENTS

| | | | |
|---|---|---|---|
| 1,727,349 | 9/1929 | Lyman | 156—157 XR |
| 1,728,974 | 9/1929 | McLaughlin et al. | 156—157 XR |
| 2,741,885 | 4/1956 | Allison | 53—198 |
| 2,982,069 | 5/1961 | England | 53—198 |
| 3,126,680 | 3/1964 | Baird et al. | 53—3 |
| 3,184,354 | 5/1965 | Strother | 156—73 |
| 3,269,300 | 8/1966 | Billett et al. | 100—8 |

FOREIGN PATENTS

| | | |
|---|---|---|
| 1,014,988 | 12/1965 | Great Britain. |
| 149,296 | 10/1960 | U.S.S.R. |

OTHER REFERENCES

Freres, Robert M.: Fabrication With Frictional Heat. In Modern Plastics, November 1945, pp. 142–145.

EARL M. BERGERT, *Primary Examiner.*

D. J. FRITSCH, *Assistant Examiner.*

U.S. Cl. X.R.

53—3, 39, 198; 83—16, 170; 100—2, 29, 33; 156—530, 580